June 23, 1964  G. BANERIAN  3,138,363
RE-ENTRY TURBINE
Filed Nov. 14, 1960  7 Sheets-Sheet 6
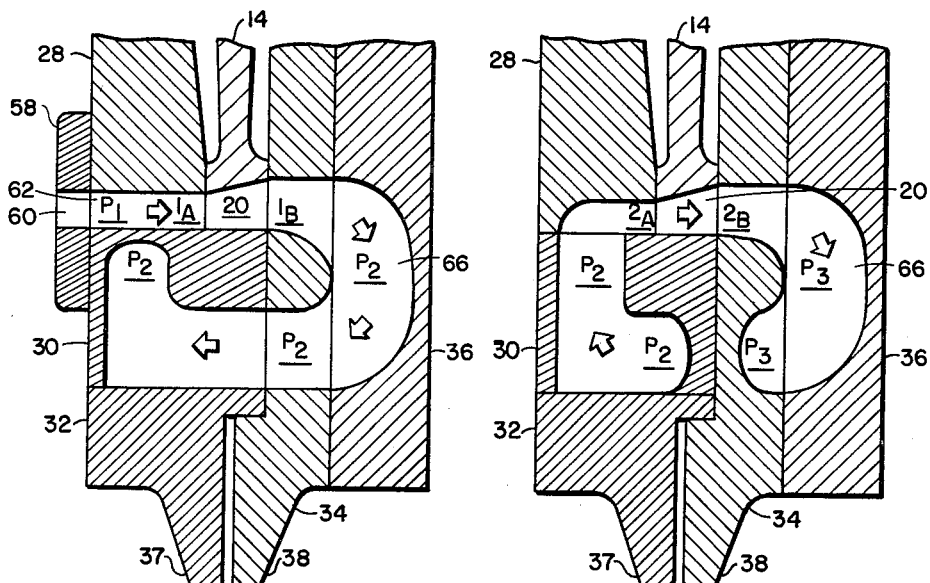
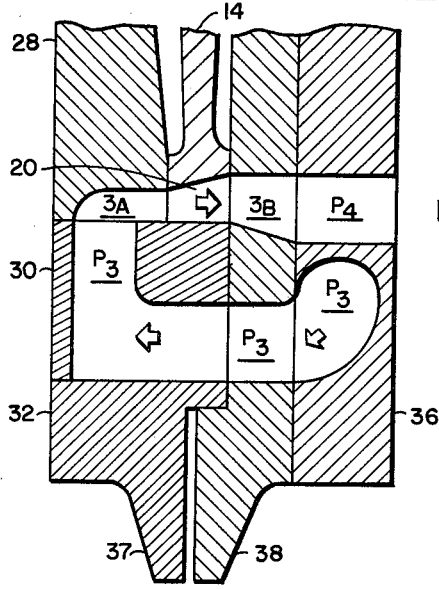
INVENTOR.
GORDON BANERIAN
BY Edward O. Ansell
ATTORNEY United States Patent Office 3,138,363
Patented June 23, 1964

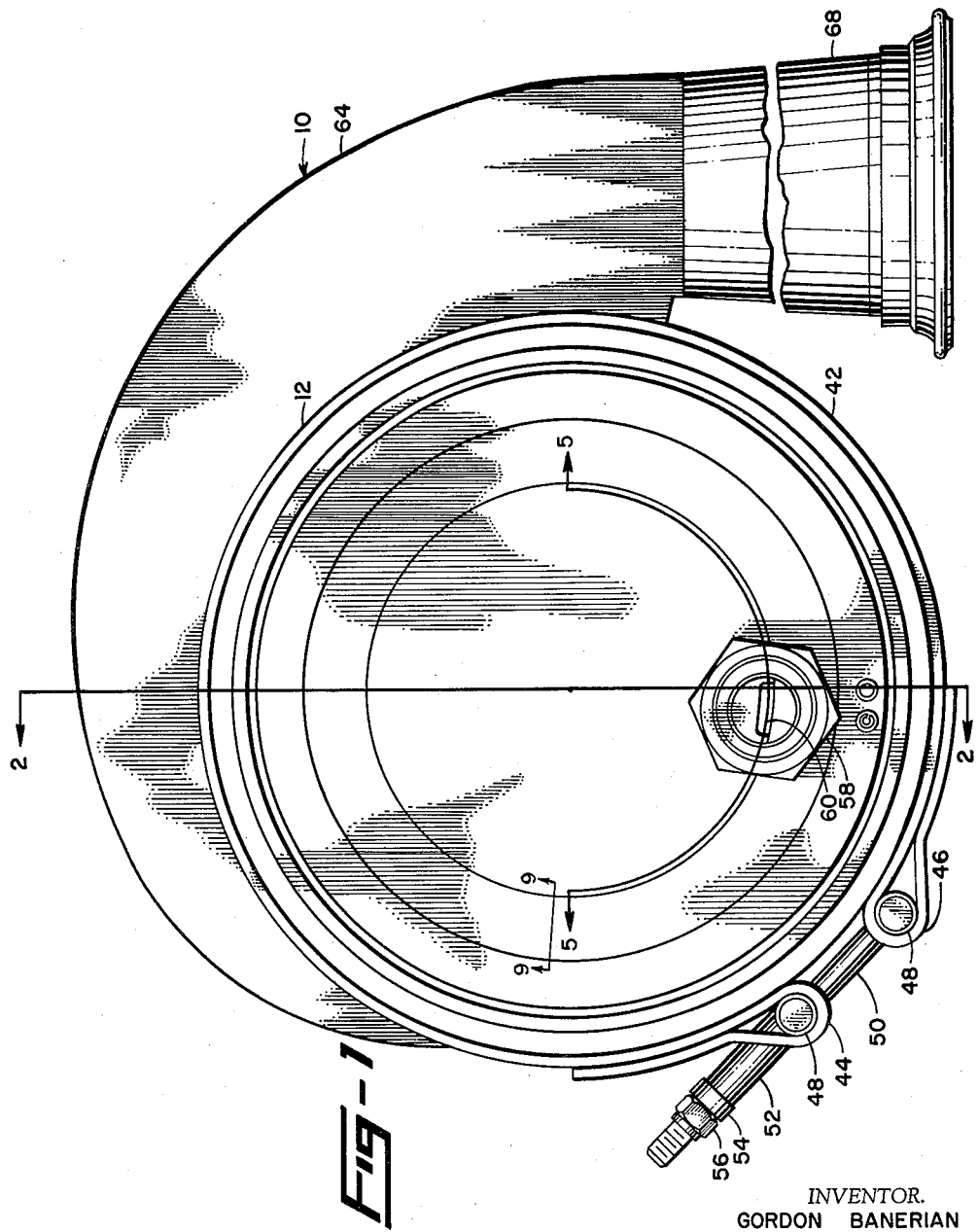

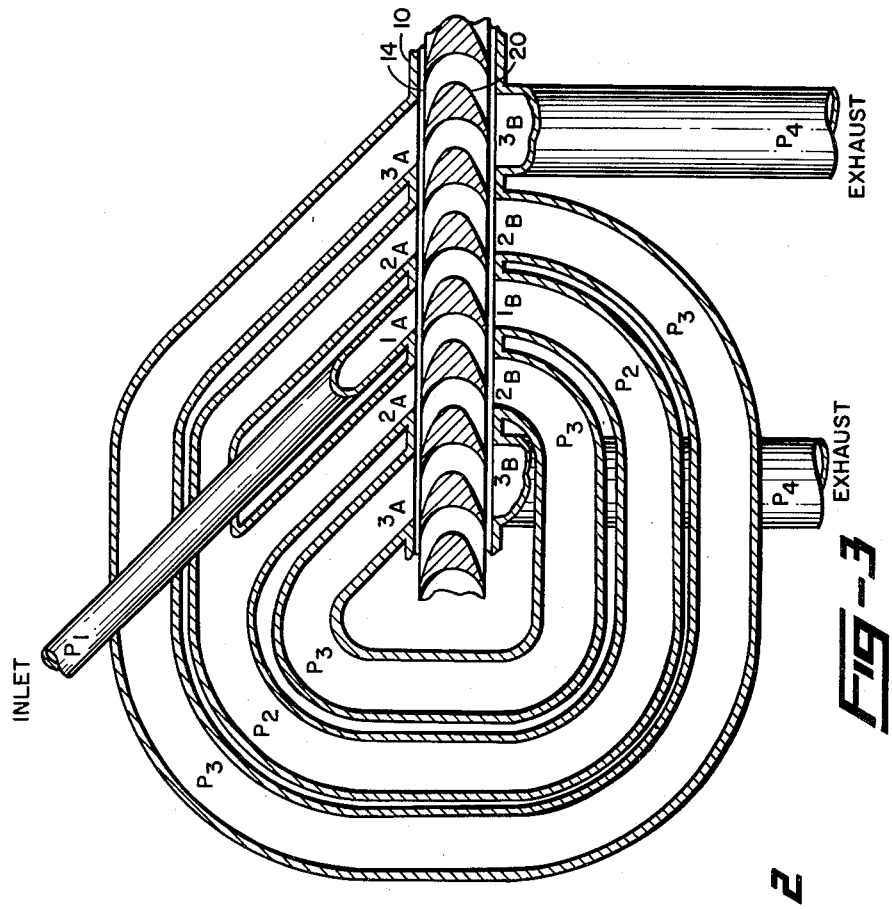
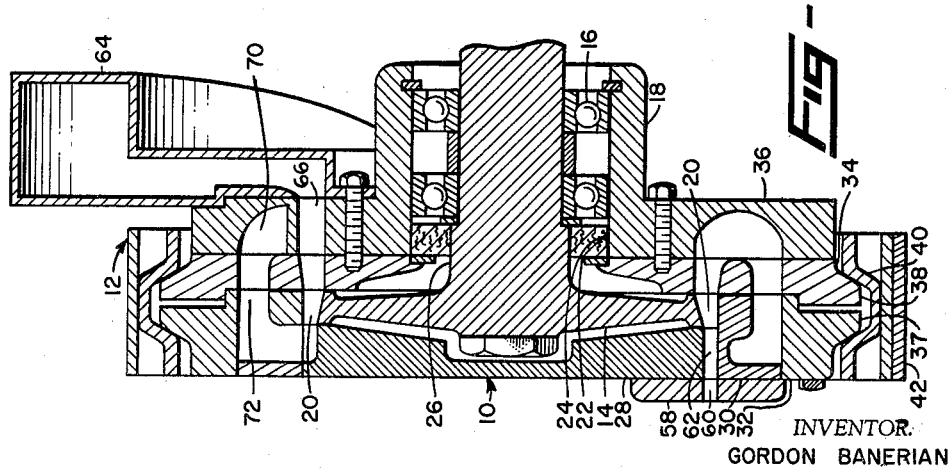

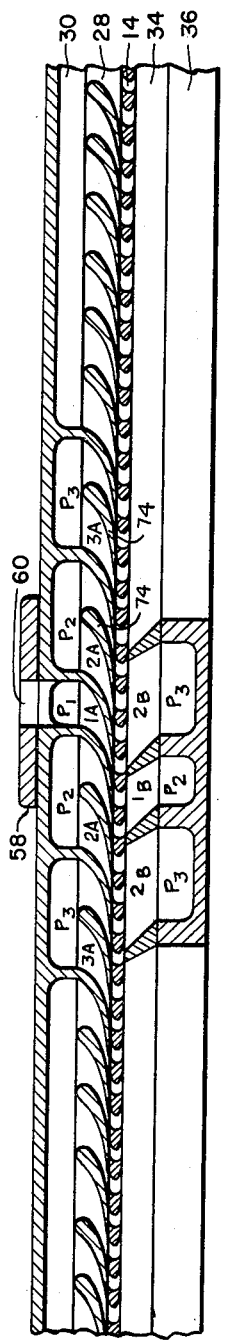
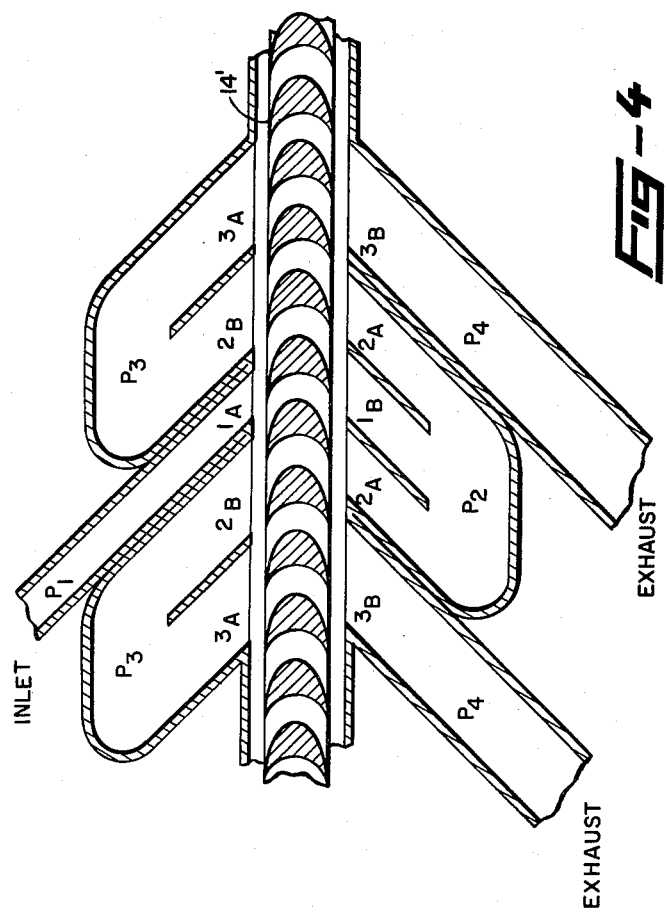

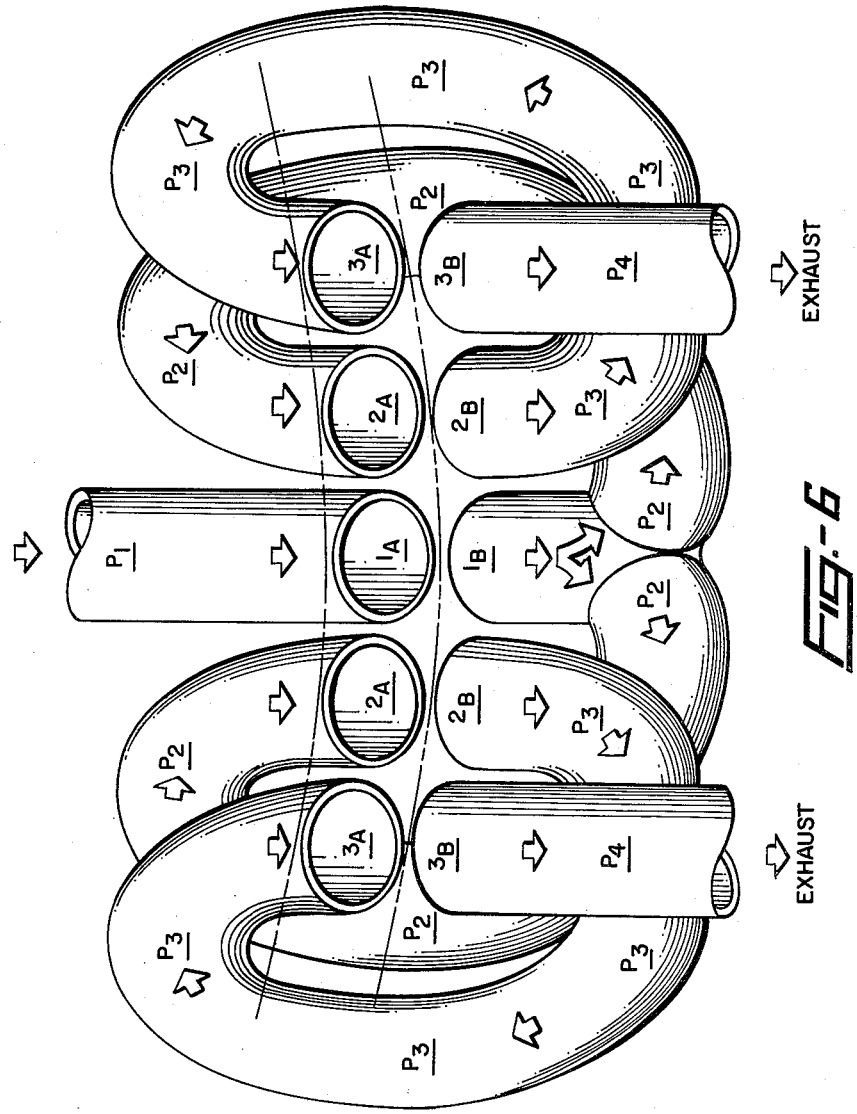

3,138,363
RE-ENTRY TURBINE
Gordon Banerian, Danville, Calif., assignor to Aerojet-General Corporation, Azusa, Calif., a corporation of Ohio
Filed Nov. 14, 1960, Ser. No. 69,196
6 Claims. (Cl. 253—66)

The present invention relates to a gas turbine and has for its principal object to provide for the elimination of excessive gas leakage from a re-entry gas turbine.

The re-entry turbine utilizes the design of a single stage turbine to gain multi-stage performance. After absorbing a part of its energy in the turbine wheel bucket, the partially expanded working fluid is collected and returned to the front side of the turbine wheel via a return duct. The working fluid is again admitted to the turbine wheel, thus expending another part of the energy of the expanding gas. This process can be continued so that a high number of stages can be combined.

Heretofore, conventional re-entry turbines have the inherent disadvantages of interstage leakage. All prior re-entry turbines have the subsequent pressure stages positioned on one side of the first pressure stage. The partially expanded gas may leak from the first stage directly to exhaust, bypassing the subsequent pressure stages and lowering turbine efficiency.

In accordance with the present invention, interstage leakage is reduced by changing the positions of the re-entry nozzles. The re-entry nozzles are positioned on opposite sides of the nozzles of the previous stage. The effect of the nozzle arrangement is to create a passage for any leaking working fluid and ducting it into a subsequent pressure stage. The total number of expansions of the working fluid is dependent upon its energy level. When the final pass of working fluid through the turbine is complete, the fluid is ducted to exhaust.

Other objects of this invention will appear in the following description and appended claims, reference being had to the accompanying drawings forming a part of this specification wherein like reference characters designate corresponding parts on the several views.

In the drawings:

FIGURE 1 is an elevational view of a re-entry turbine embodying the present invention.

FIGURE 2 is a cross-sectional view taken along line 2—2 in FIGURE 1 showing the re-entry passageways of the present invention.

FIGURE 3 is a diagrammatic view of the re-entry passageways and turbine wheel of the present invention.

FIGURE 4 is a diagrammatic view of another embodiment of the re-entry passageways and turbine wheel according to the present invention.

FIGURE 5 is a cross-sectional view taken along line 5—5 in FIGURE 1 showing the inlet and exhaust plenum chambers constructed according to the present invention.

FIG. 6 is another diagrammatic view of the present invention as shown in FIGURE 3 and illustrating the re-entry passageways and showing their position around the turbine wheel.

FIG. 8 is an enlarged view of the lower portion of FIG. 2, showing the turbine inlet and related stator structure.

FIG. 9 is an enlarged cross-sectional view taken along line 9—9 in FIG. 1, showing gas recirculation through the passageways in the stator structure.

FIG. 10 is an enlarged view of the upper portion of FIG. 2 showing the stator structure and the turbine exit, which has been reversed for purposes of clarity.

Figure 7:
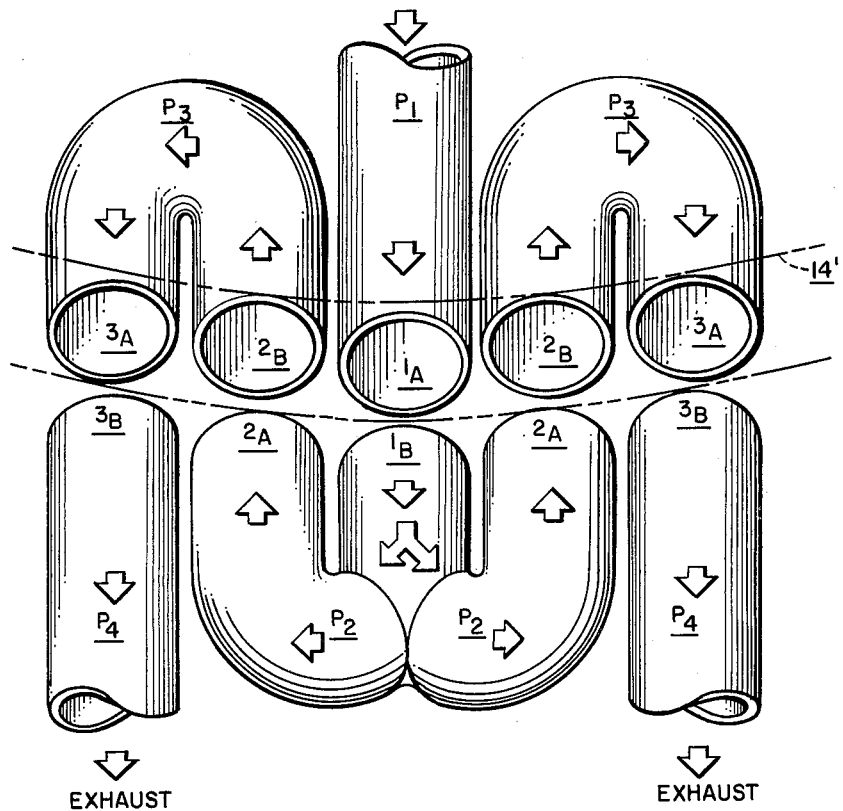
FIG. 7 is a diagrammatic view of the present invention shown in FIG. 4 and illustrating the re-entry passageways and showing their position around the turbine wheel.

Before explaining the present invention in detail, it is to be understood that the invention is not limited in its application to the details of construction and arrangement of parts illustrated in the accompanying drawings, since the invention is capable of other embodiments and of being carried out in various ways. Also, it is to be understood that the phraseology or terminology employed herein is for the purpose of description and not of limitation.

An impulse turbine 10 containing the present invention as shown in FIGURES 1 and 2 is encased within a substantially cylindrical housing 12. A turbine rotor 14 is rotatively supported by the bearings 16 that are received by the housing extension 18. Blades 20 are either integrally formed or secured to the periphery of the turbine rotor 14. A conventional seal 22 is received by the housing bore 24 and is in sealing engagement with the turbine shaft 26.

The housing 12 is of a composite construction and comprises an inlet nozzle ring 28, the crossover ring 30 (referred to in the claims as an inlet manifold or conduit member) and a flange ring 32, the exhaust member 34, and the exhaust manifold or conduit member 36. As noted in FIGURE 2, the flange ring 32 and the exhaust member 34 both have symmetrical tooth-like projections 37, 38 respectively which are in juxtaposition. A mating bridge member 40 receives the flange ring and exhaust member tooth-like projections 37, 38 so as to constantly apply pressure to the aforesaid members and to prevent the composite housing 12 from disassembling during operation. The bridging member 40 may be made of a spring steel material thus tending to close the joint between the flange ring 32 and exhaust member 34. A substantially annulus-shaped strap 42 is in abutting relation with the bridge member 40 and terminates, as shown in FIGURE 1, in a pair of eye portions 44, 46. The eye portions 44, 46 are formed by folding the strap 42 back upon itself and fixedly attached thereto as for example by welding or riveting or the like. A bushing 48 is rotatively received by the eye portion 46. A T-shaped bushing 48 is rotatably received by the eye portion 44 and has a body portion 52 that slidably receives the T bolt 50. A spacer 54 interposed between the T bushing 48 and the T bolt 50 prevents binding when the assembly is tightened. Upon rotation of the nut 56, tension is applied to the T bolt 50 thereby causing the strap 42 to tighten and lock the bridge member 40 on the flange ring 32 and exhaust member 34.

An inlet bushing 58 is fixedly attached to the housing 12 and has a rectangular pasageway 60 therethrough which is contiguously formed with the inlet passageway 62 through the inlet nozzle ring 28.

The exhaust scroll 64 is fixedly attached to the side of the housing 12 and is of a substantially L-shaped cross-section. The side elevation of the scroll 64 as shown in FIGURE 1 is somewhat of an involute shape. An annulus shaped passageway 66 through the exhaust member 34 and the exhaust manifold 36 communicates with the interior of the scroll 64 (FIGURE 2). The scroll 64 terminates in a horn-shaped passageway 68 used to duct the exhaust gases to the atmosphere.

Re-entry passageways within a turbine allow a more efficient use of the expanding gases after being passed over the turbine buckets. As illustrated in the lower portion of FIGURE 2, a typical cross section of the housing 12 shows a cross section of the inlet passageway 62 starting at the inlet nozzle ring 28 past the rotor blades 20 through the exhaust member 34, the exhaust manifold 36 and through the cross-over ring 30. The partially expanded gas is then in position for re-entry into the turbine rotor again for another pass. In the upper portion of FIGURE 2, a typical cross section of the exit of the spent or fully expanded fluid from the plenum chamber 70 in the exhaust manifold 36, a passageway 72 is shown re-entering through the cross-over ring 30 into the inlet nozzle ring 28, past the rotor blades 20. The gas is thereafter being exhausted through the exhaust manifold 36 and hence into the exhaust scroll 64.

FIGURES 3 and 6 schematically illustrate one system of recirculating or re-entering the partially expanded gas back through the turbine rotor which prevents an appreciable gas loss or leakage.

The gas enters the present system by means of an inlet passageway 62 of FIG. 2, represented here as P1. This inlet passageway P1 leads to the first inlet Nozzle 1A. As the gas exits from the inlet nozzle 1A, it expands causing the movement of the turbine rotor and thereafter passes into the exhaust opening 1B. The gas is then re-circulated to the inlet side of the turbine through passageway P2 where it is re-directed into two inlet nozzles 2A disposed on both sides of the inlet nozzle 1A. It should be noted that the passageway P2 skirts the periphery of the turbine rotor 14 in the housing 12 of the turbine as illustrated in the lower portion of FIGURE 2. Referring back to FIGURES 3 and 6, the gas exits through the inlet nozzles 2A expanding across the turbine rotor 14 and exiting through the exhaust openings 2B to be re-circulated through passageways P3 to the third set of inlet nozzles 3A. The gas finally expands to the last stage and passes through the turbine rotor 14 and exits through the exhaust openings 3B and thereafter through the exhaust manifold and exhaust scroll. It should be noted that as the gas passes through the inlet nozzle 1A, any leakage to the adjacent nozzles 2A on both sides of the inlet nozzle 1A is not lost but is re-directed in the secondary path.

The state of the art of present day re-circulating or re-entry impulse turbines presents a problem of leakage past the first inlet nozzle in a direction away from the subsequent inlet nozzles. It is apparent that the efficiency of the turbine is sharply curtailed by such leakage. With the subsequent inlet nozzles on either side of the first inlet nozzle, this leakage will be reduced and the turbine efficiency thereby increased.

A second embodiment of the present invention is illustrated in FIGURES 4 and 7 wherein the expanded gas is re-entered on the same side of the rotor as its exhaust opening. The inlet passageway P1 leads to the first inlet nozzle 1A and thereafter expands as it passes through the turbine rotor 14' into the exhaust opening 1B. Passageway P2 divides the direction of the expanded gas into opposite sides of the exhaust opening 1B and re-directs the gas to the second inlet nozzles 2A. The gas thereafter expands as it crosses the turbine rotor 14' and is discharged into the exhaust openings 2B. It is noted that the exhaust openings are on both sides of the first inlet nozzle 1A and therefore absorb all leakage from the inlet nozzle in either direction. As the gas passes through the passageways P3 it enters the inlet nozzles 3A and passes through the turbine rotor 14'. Upon final expansion as it passes through the rotor 14', the gas is exhausted through the exit openings 3B passing through passageways P4 to the exhaust manifold and to be exhausted through the exhaust scroll.

Figure 11:
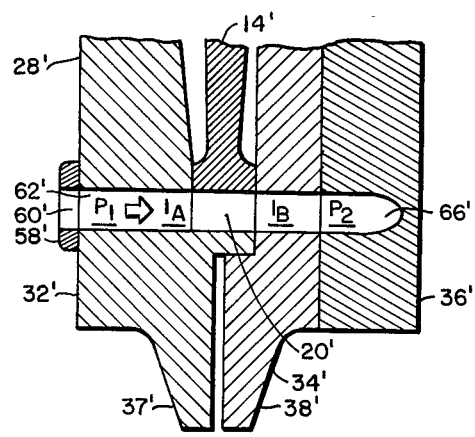
FIG. 11 is an enlarged view showing the turbine inlet and related stator structure of the embodiment shown in FIGS. 4 and 7.
Figure 12:
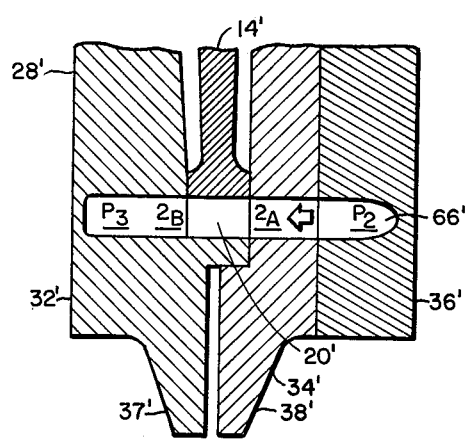
FIG. 12 is an enlarged cross-sectional view showing the gas recirculation in the passageways of the stator structure of the embodiment shown in FIGS. 4 and 7; and, FIG. 13 is an enlarged view showing the stator structure and the turbine exit of the embodiment shown in FIGS. 4 and 7.
Figure 13:
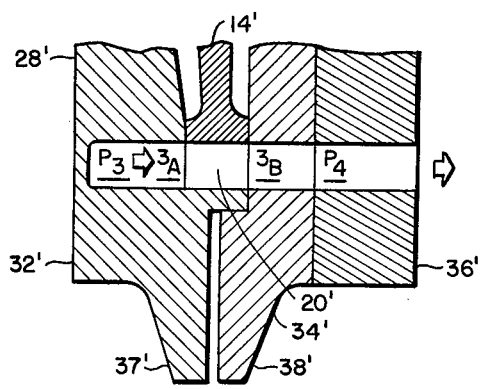

FIGURES 11, 12, and 13 illustrate the system shown schematically in FIGURES 4 and 7 in an actual turbine design. As shown in FIGURE 11, the inlet passageway P1 in the inlet nozzle ring 28' extends from the rectangular opening 60' in the inlet bushing 58' to the turbine rotor 14'. The inlet nozzle 1A directs the gas through the turbine rotor 14' and into the exhaust opening 1B. The intermediate stage, FIGURE 12, shows passageway P2 in the exhaust manifold 36' redirecting the gas back through the turbine rotor 14' through inlet nozzle 2A, one of which is located on either side of exhaust opening 1B. FIGURE 13 illustrates the exhaust of the gas from the turbine. Passageway P3 in the inlet nozzle ring has redirected the fluid through the inlet nozzle 3A, turbine rotor 14', and exhaust opening 3B. Passageway P4 in the exhaust manifold 36' carries the gas to the exhaust. Referring again to the first embodiment, FIG. 5 illustrates that the gas enters the inlet passageway 60, proceeds through passageway P1 in the inlet nozzle ring 28, and passes the inlet nozzle 1A, traveling slightly in the direction of turbine wheel rotation as it expands across the turbine wheel 14 and enters the exhaust opening 1B from where it is carried to the passageway P2 in the exhaust manifold 36. The gas travels upwardly and over the turbine wheel 14 within a passageway P2 in the cross-over ring 30 (inlet manifold) where it is divided and enters the second inlet nozzles 2A positioned on opposite sides of the first inlet nozzle 1A. It should be noted that either one or more inlet nozzles 2A may be positioned on each side of the first inlet nozzle 1A. The gas expands as it travels across the turbine rotor and travels slightly in the direction of turbine wheel rotation to enter the second exhaust openings 2B where it is collected in two passageways P3 on opposite sides of the first passageway P2. Again the gas travels upwardly and across the turbine wheel 14. Three sections, inlet, intermediate, and exhaust of the re-entry or return passageways are shown in FIGURES 8, 9, and 10. After skirting the turbine wheel 14 in passageways P3, the gas is exhausted through the plurality of inlet nozzles 3A positioned on either side of the second inlet nozzles 2A. After expanding across the turbine wheel 14, the gas passes through the exhaust manifold and to the atmosphere via the exhaust scroll. Guide vanes 74 are provided in inlet nozzles 2A and 3A to help direct the flow of gas.

Although specific embodiments of the invention have been shown and described, it will be understood, of course, that these are only illustrative and that various modifications may be made therein without departing from the scope and spirit of this invention.

In the claims:

1. An impulse turbine comprising in combination: a housing, a rotor mounted in the housing and provided with peripheral blading, first and second fixed conduit members constituting a portion of said housing and each being situated on an opposite side of the rotor, said conduit members each having a plurality of openings therein in juxtaposition with the rotor peripheral blading, said housing having a gas inlet in communication with a first of said openings, said first opening being centrally located among said plurality of openings in said first conduit member, a passageway formed in said conduit members connecting a second of said openings with a third and a fourth of said openings, said second opening being disposed in said second conduit member, said third and fourth openings being disposed on opposite sides of one of said first and second openings, and exhaust means in communication with at least one of said plurality of openings.

2. An impulse re-entry turbine comprising: an inlet manifold, an exhaust manifold fixedly attached to said inlet manifold, a turbine wheel rotatably received between said inlet manifold and said exhaust manifold, said inlet manifold having a plurality of nozzles directed toward said turbine wheel, one of said nozzles being centrally located among said plurality of inlet manifold nozzles, said exhaust manifold having a plurality of openings therein directed toward said turbine wheel, a passageway for conveying gas from one of said exhaust manifold openings to at least two of said inlet manifold nozzles positioned on opposite sides of said centrally located inlet manifold nozzle, said inlet manifold having an inlet opening in communication with said centrally located inlet manifold nozzle, and a means for exhausting gas in communication with other of said exhaust manifold openings.

3. An impulse turbine comprising: a housing having an inlet and exhaust means, a turbine wheel rotatably supported by the housing, said housing having a first inlet nozzle directed toward the turbine wheel and attached to the housing inlet means, said housing having a first exhaust opening positioned substantially opposite the first inlet nozzle, a passageway for conveying gas in communication with the first exhaust opening skirting the turbine wheel and extending on opposite sides of the first inlet nozzle, a plurality of second inlet nozzles in juxtaposition on opposite sides of the first inlet nozzle being directed toward the turbine wheel and in union with the gas conveying passageway, a plurality of second exhaust openings directed toward the turbine wheel and positioned on opposite sides of the first exhaust opening, a plurality of secondary passageways for conveying gas in communication with the plurality of second exhaust openings skirting the turbine wheel and extending on opposite sides of the plurality of second inlet nozzles, a plurality of third inlet nozzles positioned on opposite sides of the second inlet nozzles directed toward the turbine wheel and in union with the plurality of secondary gas conveying passageways, and said exhaust means being positioned on opposite sides of the second exhaust openings directed toward the turbine wheel and attached to the housing.

4. An impulse turbine comprising in combination: a housing, a pair of conduit members constituting a portion of the housing, a turbine wheel rotatably supported within the housing and positioned between the pair of conduit members, said conduit members having a plurality of orifices, said housing and one of said conduit members having an inlet passageway therethrough terminating in a first of said plurality of orifices in juxtaposition to the turbine wheel, a passageway in said housing communicating from a second of said plurality of orifices in the other of said conduit members to a third and a fourth of said plurality of orifices in said one of said conduit members on opposite sides of said first orifice, and a plurality of exhaust means in communication with other of said plurality of orifices.

5. An impulse turbine comprising: a housing having an inlet and outlet means, a turbine wheel rotatably supported by the housing, said housing having a first inlet nozzle directed toward said turbine wheel and in communication with said housing inlet means, said housing having a first exhaust opening positioned substantially opposite the first inlet nozzle, a first passageway for conveying gas in communication with said first exhaust opening and extending to opposite sides of said first exhaust opening, a plurality of second inlet nozzles directed toward said turbine wheel on opposite sides of said first exhaust opening and in communication with said gas conveying passageway, a plurality of second exhaust openings positioned substantially opposite the plurality of second inlet nozzles and on opposite sides of said first inlet nozzle, a plurality of secondary passageways for conveying gas in communication with said plurality of second exhaust openings and extending to opposite sides of said second exhaust openings, a plurality of third inlet nozzles directed toward said turbine wheel on opposite sides of said second exhaust openings and in communication with said plurality of secondary gas conveying passageways, a plurality of third exhaust openings positioned substantially opposite the plurality of third inlet nozzles and on opposite sides of said second inlet nozzles, and said housing outlet means being in communication with said plurality of third exhaust openings.

6. An impulse turbine comprising in combination: a housing, a pair of fixed conduit members constituting a portion of the housing, a turbine wheel rotatably supported within said housing and positioned between the pair of fixed conduit members, one of said conduit members having an inlet passage therethrough terminating in a first inlet orifice in juxtaposition to the turbine wheel, an exhaust orifice positioned substantially opposite said first inlet orifice, a passageway for conveying gas in communication with said exhaust orifice and extending through said fixed conduit members to opposite sides of said first inlet orifice, a plurality of second inlet orifices in communication with said passageway on opposite sides of said first inlet orifice, a plurality of second exhaust orifices positioned substantially opposite from said second inlet orifices, a plurality of secondary passageways for conveying gas in communication with said plurality of second exhaust orifices and extending through said fixed conduit members to opposite sides of said plurality of second inlet orifices, a plurality of third inlet orifices in communication with said plurality of secondary passageways on opposite sides of said plurality of second inlet orifices, a plurality of third exhaust orifices positioned substantially opposite from said third inlet orifices, and a plurality of exhaust passageways in said other conduit member in communication with said plurality of third exhaust orifices.

References Cited in the file of this patent

UNITED STATES PATENTS

| | | |
|---|---|---|
| 731,009 | Zahikjanz | June 16, 1903 |
| 1,031,757 | Westinghouse | July 9, 1912 |
| 1,076,952 | Church et al. | Oct. 28, 1913 |
| 1,137,590 | Ehrhart | Apr. 27, 1915 |
| 1,137,591 | Ehrhart | Apr. 27, 1915 |
| 1,424,263 | Schmidt | Aug. 1, 1922 |
| 2,828,103 | Berch | Mar. 25, 1958 |

FOREIGN PATENTS

| | | |
|---|---|---|
| 833,044 | Germany | Mar. 3, 1952 |
| 879,344 | Germany | June 11, 1953 |